(12) United States Patent
Nouri

(10) Patent No.: US 7,103,613 B2
(45) Date of Patent: Sep. 5, 2006

(54) OBJECT ORIENTED QUERY ROOT LEAF INHERITANCE TO RELATIONAL JOIN TRANSLATOR METHOD, SYSTEM, ARTICLE OF MANUFACTURE, AND COMPUTER PROGRAM PRODUCT

(75) Inventor: Ahmad Nouri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/438,472

(22) Filed: May 14, 2003

(65) Prior Publication Data

US 2004/0230584 A1    Nov. 18, 2004

(51) Int. Cl.
  G06F 17/30     (2006.01)
(52) U.S. Cl. .................. 707/103 R; 707/102; 715/700; 709/223
(58) Field of Classification Search ..................... None
  See application file for complete search history.

(56) References Cited

U.S. PATENT DOCUMENTS

| | | | | |
|---|---|---|---|---|
| 5,504,885 | A | * | 4/1996 | Alashqur ................... 717/141 |
| 5,694,598 | A | * | 12/1997 | Durand et al. .......... 707/103 R |
| 5,765,159 | A | * | 6/1998 | Srinivasan .................. 707/102 |
| 5,774,692 | A | | 6/1998 | Boyer et al. ................ 395/500 |
| 5,797,136 | A | | 8/1998 | Boyer et al. .................... 707/2 |
| 5,829,006 | A | * | 10/1998 | Parvathaneny et al. ..... 707/101 |
| 5,878,427 | A | | 3/1999 | Waheed et al. ............. 707/103 |

(Continued)

OTHER PUBLICATIONS

Gustav Fahl, Tore Risch, "Query processing over object views of relational data." 1997. The VLDB Journal. vol. 6, pp. 261-281.*

(Continued)

*Primary Examiner*—Jeffrey Gaffin
*Assistant Examiner*—Mark Andrew X Radtke
(74) *Attorney, Agent, or Firm*—David W. Victor; Konrad, Raynes & Victor LLP

(57) ABSTRACT

An object oriented query such as an enterprise java bean query is translated into a corresponding relational query by identifying an inter-hierarchal relationship relating two or more object oriented hierarchies; identifying a source object oriented hierarchy of the inter-hierarchal relationship; mapping the source object oriented hierarchy into corresponding source relational tables; building a source series of joins between the source relational tables, the source series being ordered in a top-down order from a root of the source object oriented hierarchy; identifying a target class of the inter-hierarchal relationship; mapping the target object oriented hierarchy into corresponding target relational tables; building a target series of joins between the target relational tables, the target series comprising a first target series and a second target series, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and combining the source series of joins and the target series of joins into the corresponding relational query. For a query selection based upon a plurality of relationships between the object oriented hierarchies, the steps may be repeated for each of the plurality of relationships. The combined series of joins may be further reordered by recursively finding a join relationship between a current node and a preceding node in the combined series of joins. To improve performance, a join above a target of a relationship is built as an inner join, and a join below the target of relationship is built as an outer join.

12 Claims, 6 Drawing Sheets

U.S. PATENT DOCUMENTS

| | | | |
|---|---|---|---|
| 5,878,431 A | 3/1999 | Potterveld et al. | 707/103 |
| 5,937,409 A * | 8/1999 | Wetherbee | 707/103 R |
| 5,970,490 A | 10/1999 | Morgenstern | 707/10 |
| 6,047,284 A * | 4/2000 | Owens et al. | 707/4 |
| 6,105,035 A * | 8/2000 | Monge et al. | 707/103 R |
| 2004/0015487 A1* | 1/2004 | Lin et al. | 707/3 |
| 2005/0065927 A1* | 3/2005 | Nouri et al. | 707/4 |
| 2005/0125432 A1* | 6/2005 | Lin et al. | 707/101 |

OTHER PUBLICATIONS

IBM VisualAge® for Java, Version 3.5, EJB Development Environment, International Business Machines Corporation 1998, 2000, pp. 1-173.

IBM VisualAge® for Java, Version 3.5, Building applications with persistence support, International Business Machines Corporation 1997, 2000, pp. 1-159.

* cited by examiner

OBJECT ORIENTED QUERY ROOT LEAF INHERITANCE TO RELATIONAL JOIN TRANSLATOR METHOD, SYSTEM, ARTICLE OF MANUFACTURE, AND COMPUTER PROGRAM PRODUCT

BACKGROUND OF THE INVENTION

1. Field of the Invention

The present invention relates in general to computer programs, and more particularly to translating an object oriented query into a relational query.

2. Description of the Related Art

Enterprise JavaBeans (EJB) is a specification of an architecture for developing and deploying component-based distributed applications. Distributed applications developed using the Enterprise JavaBeans architecture are scalable, transactional, and multi-user secure. Such a distributed application may be written once, and then deployed on various server platforms supporting the Enterprise JavaBeans specification. An EJB architecture comprises an EJB server, EJB containers that execute on the EJB server, and EJB's that execute in these EJB containers. EJB servers and EJB containers are developed and deployed by various middleware providers, and an application developer may use the EJB components to develop and deploy a component-based distributed application.

Enterprise Java Beans 2.0 (EJB 2.0) defines an EJB Query Language (EJBQL) which provides a solution for defining portable finder methods for container managed persistence (CMP) entity beans. Prior to EJB QL, the specification of CMP finder methods for a bean was vendor specific. If such a vendor specific bean is deployed into a different database having a different database schema mapping, then the vendor specific finder helper methods must be redefined. EJB Query Language makes the specification of finder methods easier and more portable.

The EJB Query Language provides a construct known as a path expression which specifies a navigation route from a previously referenced schema to a new schema. A path expression may appear in an EJB QL query in either a SELECT clause, a WHERE clause, or a FROM clause, and thus path expressions affect both the scope and the results of an EJB QL query). However, although an EJB QL query may be converted into a SQL query to execute against a database, the path expressions are extensions not found in SQL.

Path expressions may be translated to SQL joins operations when EJB's are mapped to relational tables. Path expressions in the SELECT clause are translated to a left outer join, path expressions in the FROM clause are translated to an inner join, and path expressions in the WHERE clause can be translated to either an inner join or an outer join depending on usage context. The translated SQL then consists a mixture of inner and left outer joins operations. Although a series of inner joins can appear in any order, the order of a mixture of inner joins and outer joins is critical for both the validity and performance of the query.

Several different techniques may be used to map EJB's to relational tables. In single-table inheritance, all of the attributes of all of the classes are stored in a single table. In multiple-table inheritance or distinct table inheritance, each entity bean is mapped to a separate table in which the table representing a class includes all of the attributes of the class, both those attributes defined by the class, and those attributes inherited by the class from its superclasses. Another mapping strategy is root-leaf inheritance in which each class in a hierarchy maps to a table that contains only those attributes actually defined in that class, plus the key columns shared by all members of the hierarchy.

Root leaf inheritance may present a particular problem as to the validity of a query generated by EJBQL. For example, root leaf inheritance maps each EJB to one or more tables. EJB Query Language allows a user to use a path expression to connect or relates a root leaf inheritance hierarchy or tree to another root leaf inheritance hierarchy. This mapping builds series of inner joins and outer joins between the root leaf inheritance hierarchies. If a source of a relationship starts from a top of one root leaf inheritance hierarchy and targets a bottom of another root leaf inheritance hierarchy, then the inheritance relationship requires a join from top to bottom of all of the related nodes (tables) of the first root leaf inheritance hierarchy to be joined with a join from top to bottom of all of the related nodes (tables) of the other root leaf inheritance hierarchy.

This series of joins results in an invalid query because, in this series, the bottom node of the first root leaf inheritance hierarchy is adjacent to the top node of the second root leaf inheritance hierarchy. As there is no relationship between the bottom node of the first root leaf inheritance hierarchy and the top node of the second root leaf inheritance hierarchy, the join between these two nodes cannot be performed because no join can be found. Therefore, the inability to perform the joins results in the invalid query.

Thus, there is a clearly felt need for an improved method, system, article of manufacture, and computer program product for translating from a query comprising root leaf inheritance to relational joins.

SUMMARY OF THE INVENTION

Preferred embodiments of the present invention comprise a method, system, article of manufacture, and computer program product for translating an object oriented query into a relational query.

In accordance with a preferred embodiment of the present invention, an object oriented query such as an enterprise java bean query is translated into a corresponding relational query by identifying an inter-hierarchal relationship relating two or more object oriented hierarchies; identifying a source object oriented hierarchy of the inter-hierarchal relationship; mapping the source object oriented hierarchy into corresponding source relational tables; building a source series of joins between the source relational tables, the source series being ordered in a top-down order from a root of the source object oriented hierarchy; identifying a target class of the inter-hierarchal relationship; mapping the target object oriented hierarchy into corresponding target relational tables; building a target series of joins between the target relational tables, the target series comprising a first target series and a second target series, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and combining the source series of joins and the target series of joins into the corresponding relational query.

In accordance with an aspect of a preferred embodiment of the present invention, the above steps may be repeated for each of a plurality of relationships for a query selection based upon the plurality of relationships between the object oriented hierarchies.

In accordance with another aspect of a preferred embodiment of the present invention, the combined series of joins may be further reordered by recursively finding a join relationship between a current node and a preceding node in the combined series of joins.

In accordance with another aspect of a preferred embodiment of the present invention, a join above a target of a relationship is built as an inner join, and a join below the target of relationship is built as an outer join to improve performance.

A preferred embodiment of the present invention has the advantage of providing improved translation of an object oriented query into a relational query.

A preferred embodiment of the present invention has the advantage of providing improved translation of an object oriented query comprising root leaf inheritance into a relational query.

A preferred embodiment of the present invention has the advantage of providing improved performance of a relational query translation of an object oriented query comprising root leaf inheritance.

A preferred embodiment of the present invention has the advantage of providing improved flexibility in the storage and retrieval of objects stored as relational tables.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
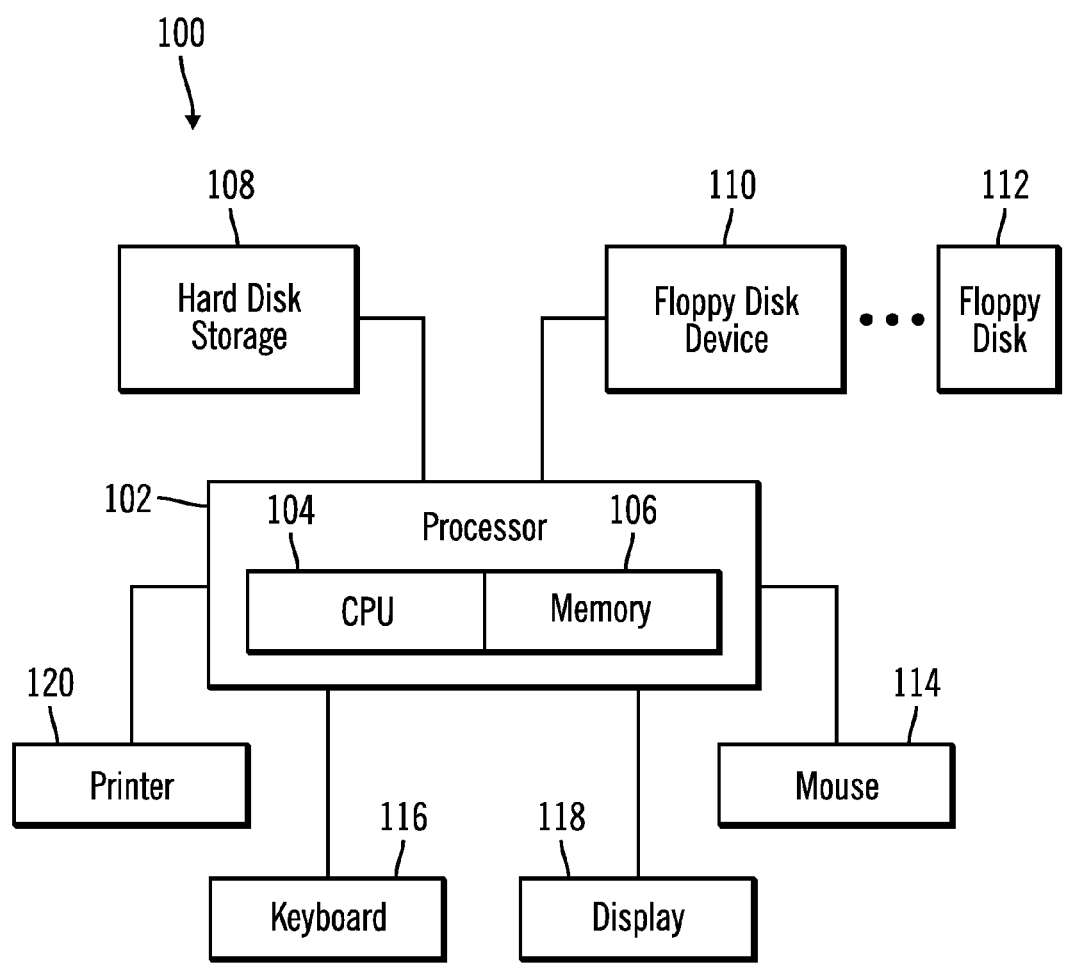
FIG. 1 is a block diagram of a computer system used in performing a method of a preferred embodiment of the present invention, forming part of an apparatus of a preferred embodiment of the present invention, storing a data structure of a preferred embodiment of the present invention, and which may use an article of manufacture comprising a computer-readable storage medium having a computer program embodied in said medium which may cause the computer system to practice a preferred embodiment of the present invention.

With reference now to the figures, and in particular with reference to FIG. 1, there is depicted a pictorial representation of a computer system 100 which may be utilized to implement a method, system, article of manufacture, data structure, and computer program product of preferred embodiments of the present invention. The block diagram of FIG. 1 illustrates a computer system 100 used in performing the method of the present invention, forming part of the apparatus of the present invention, and which may use the article of manufacture comprising a computer-readable storage medium having a computer program embodied in said medium which may cause the computer system to practice the present invention. The computer system 100 includes a processor 102, which includes a central processing unit (CPU) 104, and a memory 106. Additional memory, in the form of a hard disk file storage 108 and a computer-readable storage device 110, is connected to the processor 102. Computer-readable storage device 110 receives a computer-readable storage medium 112 having a computer program embodied in said medium which may cause the computer system to implement the present invention in the computer system 100. The computer system 100 includes user interface hardware, including a mouse 114 and a keyboard 116 for allowing user input to the processor 102 and a display 118 for presenting visual data to the user. The computer system may also include a printer 120.

Figure 2:
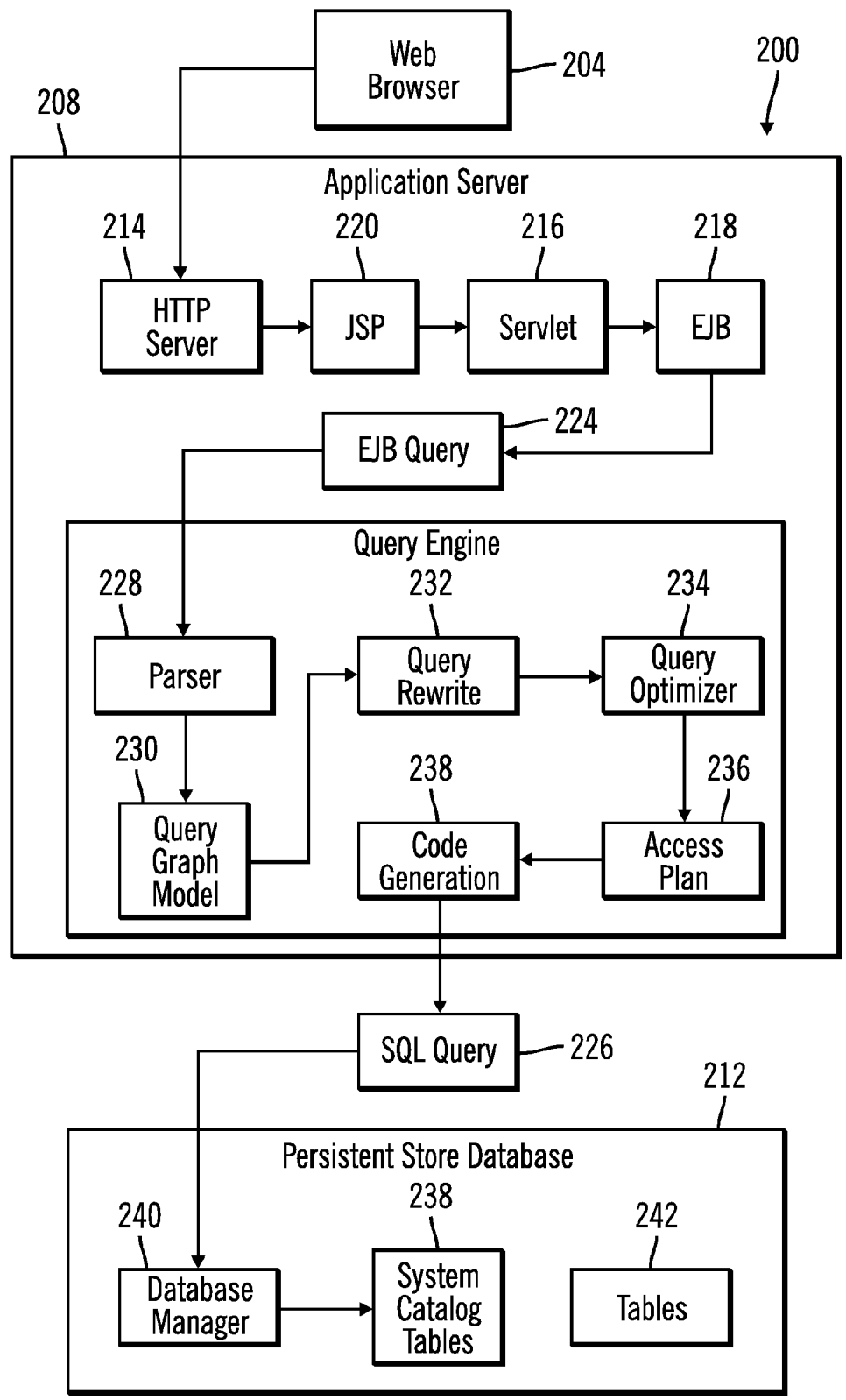
FIG. 2 is a block diagram of a preferred embodiment of the present invention.

FIG. 2 illustrates an e-business application environment 200 which facilitates the building, running, and management of multi-tiered, web-enabled e-business applications. The application environment 200 usually comprises three tiers: a first tier comprising a web browser 204; a second middle tier comprising an application server 208; and a third tier comprising a persistent store 212. The first tier web browser 204 is provided services through an HTTP server 214 by a servlet 216 executing on the application server 208. The servlet 216 may comprise one or more Enterprise JavaBeans (EJB) 218. These EJB's 218 use the persistent store 212 for container-managed persistence. A query against the persistent store 212 is mapped from EJBQL to the native query language of the persistent store 212.

Web browsers 204, pervasive devices, PCs and other tier one devices may access an HTTP server 214 on the middle tier 208 within the application server environment 200. This access may invoke Java Server Pages (JSP) 220 or servlets 216, managed by the application server 208, that access the tier three persistent store 212 data using Java Database Connectivity (JDBC), SQL for Java (SQLJ), or JB Query Language (EJBQL).

The persistent store 212 stores state information for servlets 216 and EJB session beans 218, and it serves as back-end storage for bean-managed and container-managed persistence for EJBs 218. JSPs 220 and servlets 216 may also indirectly access a remote data source 212 using EJBs 218, that are invoked using remote method invocation. In addition to web browsers 204, other types of client applications can invoke EJBs 218 directly by remote method invocation.

Session and entity beans execute business logic on the middle tier 208. Both can customize their access to data using container-managed persistence (CMP). The EJB 2.0 draft specification includes an EJB Query Language that defines finder and select methods to facilitate the use of CMP by entity beans. For the entity beans 218 to access data in the persistent store 212, the EJBQL query 224 is translated into the native language of the persistent store, such as a SQL query 226, by an EJB query engine 222.

The translation and compilation of an EJBQL query 224 into a SQL query 226 comprises several steps: parsing the query 228, building a query graph model 230, rewriting the query 232, optimizing the query 234, and generating an executable access plan 236.

The query engine parser 228 parses the query 224 to validate the syntax and semantics, and to create a query graph model (QGM) 230 which is an internal, in-memory database that is used to represent the query throughout the query compilation process.

The query rewrite component 232 of the query engine 222 uses the global semantics provided in the query graph model 230 to transform the query 224 into a form that can be optimized more easily. For example, the query rewrite component 232 might move a predicate, altering the level at which it is applied and potentially improving query performance.

The optimizer portion 234 of the query engine 222 uses the query graph model 230 as input, and generates many alternative execution plans 236 for satisfying the user's request. It estimates the execution cost of each alternative plan 236, using the statistics for tables, indexes, columns and functions, and chooses the access plan 236 with the smallest estimated execution cost. The output from this step is an access plan 236.

In the code generation component 238, the query engine 222 uses the access plan 236 and the query graph model 230 to create an executable access plan 236, or section, for the query. Code generation 238 uses information from the query graph model 230 to avoid repetitive execution of expressions that only need to be computed once for a query. Information about access plans 236 is stored in the system catalog tables 244. When the executable access plan 236 is executed, the database manager 240 uses the information stored in the system catalog tables 244. to determine how to access the data stored in tables 242 and provide results for the query.

In order to translate an EJB QL query comprising root leaf inheritance to a valid SQL query with improved performance, the preferred embodiment of the present invention alters the operation of the above parser, query rewrite, optimization, and code generation components as described below.

Figure 3:
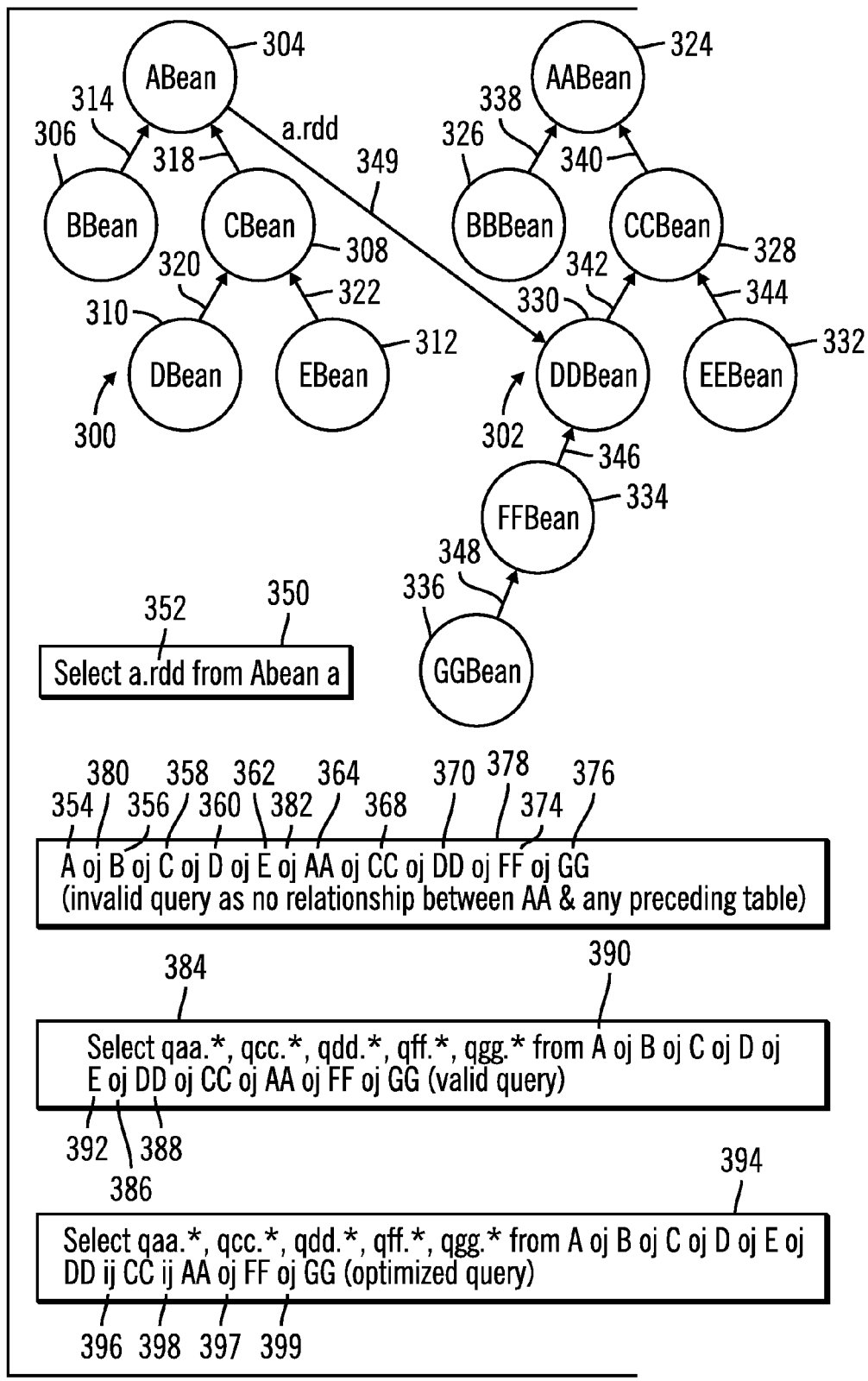
FIG. 3 and FIG. 4 illustrate application of a preferred embodiment of the present invention on object oriented hierarchies.
Figure 4:
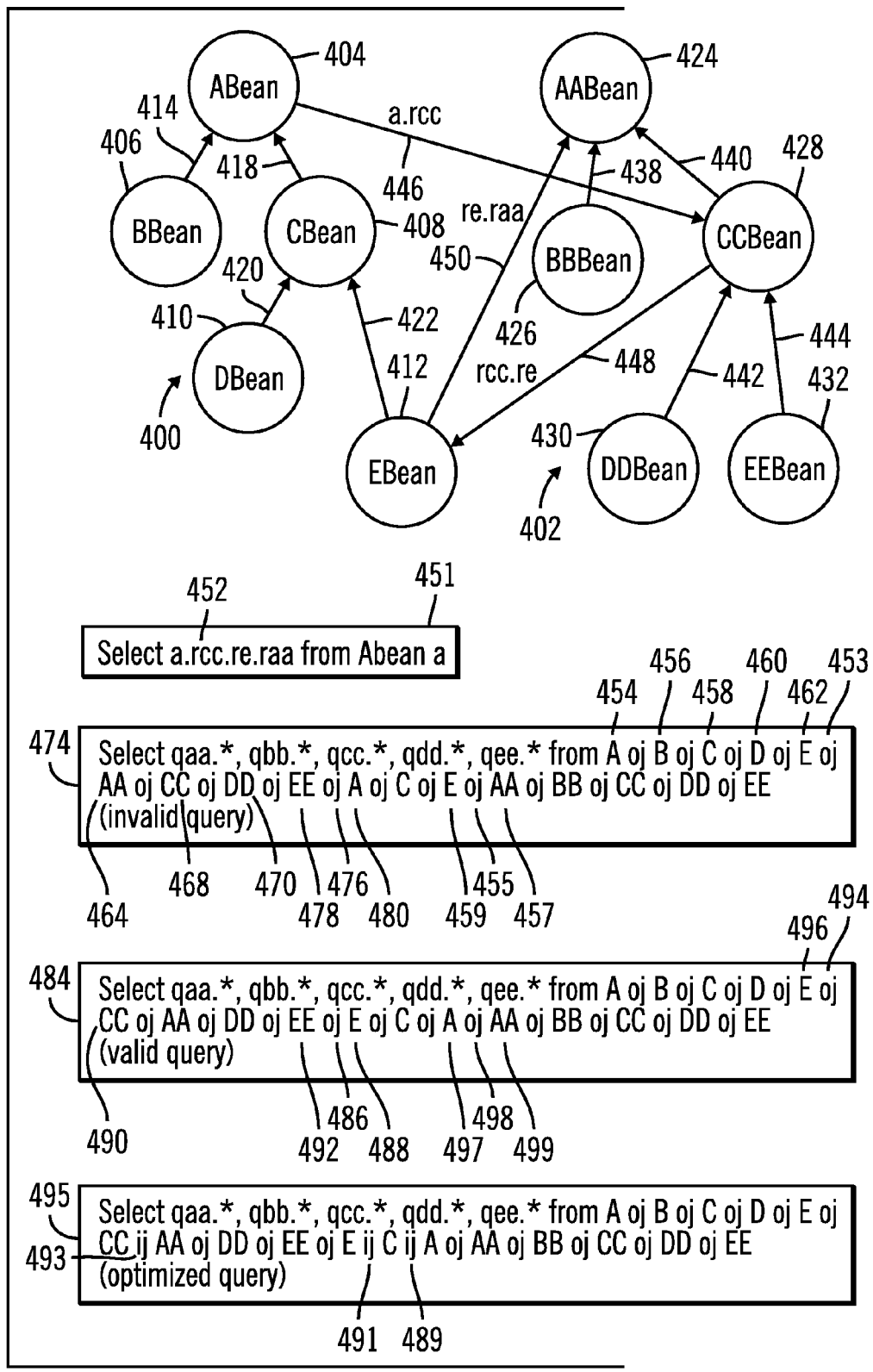

Referring now to FIG. 3, an application of a preferred embodiment of the present invention on two object oriented hierarchies related by a single relationship is illustrated. Assume an application having an EJB model comprising two RLI trees 300 and 302. The first RLI tree 300 contains five EJBs: ABean 304, BBean 306, CBean 308, DBean 310, and EBean 312. BBean 306 and CBean 308 inherit from ABean 304. BBean 306 inherits from ABean 304 via inheritance relationship 314, and CBean 308 inherits from ABean 304 via inheritance relationship 318. DBean 310 and EBean 312 inherit from CBean 308. DBean 310 inherits from CBean 308 via inheritance relationship 320, and EBean 312 inherits from CBean 308 via inheritance relationship 322. ABean 304, BBean 306, CBean 308, DBean 310, and EBean 312 map to relational tables A 354, B 356, C 358, D 360, and E 362, respectively.

The second RLI tree 302 contains seven EJBs: AABean 324, BBBean 326, CCBean 328, DDBean 330, EEBean 332, FFBean 334, and GGBean 336. BBBean 326 and CCBean 328 inherit from AABean 324. BBBean 326 inherits from AABean 324 via inheritance relationship 338, and CCBean 328 inherits from AABean 324 via inheritance relationship 340. DDBean 330 and EEBean 332 inherit from CCBean 328. DDBean 330 inherits from CCBean 328 via inheritance relationship 342, and EEBean 332 inherits from CCBean 328 via inheritance relationship 344. FFBean 334 inherits from DDBean 330 via inheritance relationship 346, and GGBean 336 inherits from FFBean 334 via inheritance relationship 348. AABean 324, CCBean 328, DDBean 330, FFBean 334, and GGBean 336 map to relational tables AA 364, CC 368, DD 370, FF 374, and GG 376, respectively.

Assume, there is a relationship defined between ABean and DDBean 330 named a.rdd 349. The following EJB query 350 displays all DDBean 330 information which is related to ABean 304.

Select a.rdd from ABean a

A conventional system may translate this EJB query 350 to the following SQL query 378 which contains a series of inner joins and outer joins. Assume that "oj" represents a left outer join, and that "ij" represents an inner join. The qualifiers "qdd.*", "qcc.*", and "qaa.*" specify, in the SQL SELECT clause, all fields related to a specific table (e.g. qaa.* means all fields for AABean).

Select qaa.*, qcc.*, qdd.*, qff.*, qgg.* from A oj B oj C oj D oj E oj AA oj CC oj DD oj FF oj GG However, this conventional translation results in an invalid query 378 as the query 378 uses an invalid join "oj" 382 between the table E 362 and the table AA 364. The join 382 is invalid as there is no join between the table AA 364 and any node in the first tree 300 because there is no relationship between the AABean 324, at the top of the second tree 302, and any of the nodes of the first tree 300: ABean 304, BBean 306, CBean 308, DBean 310, or EBean 312. The relationship between the two trees is a.rdd 349 which is a relationship between ABean 304, at the top of the first tree 300, and the DDBean 330, in the middle of the second tree 302.

By using the preferred embodiment of the present invention, the above example will be translated to the following valid SQL query 384.

Select qaa.*, qcc.*, qdd.*, qff.*, qgg.* from A oj B oj C oj D oj E oj DD oj CC oj AA oj FF oj GG This translation results in a valid query 384 as the query 384 uses an valid join "oj" 386 between the table DD 388 and the joins of the preceding tables A 390 through E 392. The join 386 is valid based upon the a.rdd relationship 349 between DDBean 330, in the middle of the second tree 302, and the ABean 304, at the top of the first tree 300.

For performance, the joins above the target of a relationship are built as inner joins 396 and 398, and the joins below the target of a relationship are built as outer joins 397 and 399 resulting in the following optimized query 394.

Select qaa.*, qcc.*, qdd.*, qff.*, qgg.* from A oj B oj C oj D oj E oj DD ij CC ij AA oj FF oj GG To accomplish the translation of the EJB query into a valid optimized SQL query, the preferred embodiment of the present invention performs the following steps. During parsing, the inter-hierarchal relationship a.rdd 349 relating the two object oriented hierarchies 300 and 302 is identified. The source class ABean 304 of the inter-hierarchal relationship a.rdd 349 is identified, and the source class ABean 304 is mapped into the corresponding source relational tables by mapping ABean 304, BBean 306, CBean 308, DBean 310, and EBean 312 to relational tables A 354, B 356, C 358, D 360, and E 362, respectively. A source series of joins between the source relational tables is built comprising {A oj B oj C oj D oj E}, the source series being ordered in a top-down order from a root ABean 304 of the source object oriented hierarchy 300.

During query rewrite, the target class DDBean 330 of the inter-hierarchal relationship a.rdd 349 is identified, and the target class DDBean 330 is mapped into the corresponding target relational tables by mapping AABean 324, CCBean 328, DDBean 330, FFBean 334, and GGBean 336 to relational tables AA 364, CC 368, DD 370, FF 374, and GG 376, respectively. A target series of joins {DD oj CC oj AA oj FF oj GG} between the target relational tables is built, the target series being ordered as two series, a first target series {DD oj CC oj AA} starting from the target class and reverse ordered upwards towards a root of the target object oriented hierarchy, and a second target series {FF oj GG} starting below the target class and ordered downwards towards leaves of the target object oriented hierarchy. Alternatively, the first target series {AA oj CC oj DD} may be ordered starting from the root of the target object oriented hierarchy towards the target class, or the second target series {GG oj FF} may be ordered starting from the leaves of the target object oriented hierarchy to below the target class.

The source series of joins {A oj B oj C oj D oj E} and the target series of joins {DD oj CC oj AA oj FF oj GG} are combined into the corresponding relational query {A oj B oj C oj D oj E oj DD oj CC oj AA oj FF oj GG}. For a query selection based upon a plurality of relationships between the object oriented hierarchies, these steps may be repeated for each of the plurality of relationships.

Also, in query rewrite, the combined series of joins {A oj B oj C oj D oj E oj DD oj CC oj AA oj FF oj GG} may be further reordered by recursively finding a join relationship between a current node and a preceding node in the combined series of joins. Although the combined series of joins {A oj B oj C oj D oj E oj DD oj CC oj AA oj FF oj GG} does not require reordering, the above alternate combined series of joins {A oj B oj C oj D oj E oj AA oj CC oj DD oj FF oj GG} would be reordered by such query rewrite into the combined series of joins {A oj B oj C oj D oj E oj DD oj CC oj AA oj FF oj GG}.

In query optimization, a join above the target of the relationship {DD ij CC ij AA} is built as an inner join, and a join below the target of relationship is built as an outer join {FF oj GG} which yields the optimized set of joins {A oj B oj C oj D oj E oj DD ij CC ij AA oj FF oj GG}.

The following multiple relationship example illustrates a query selection based upon a plurality of relationships between the object oriented hierarchies, in which certain of the steps are repeated for each of the plurality of relationships.

Assume an application having EJB model comprising two RLI trees 400 and 402. The first RLI tree 400 contains five EJBs: ABean 404, BBean 406, CBean 408, DBean 410, and EBean 412. BBean 406 and CBean 408 inherit from ABean 404. BBean 406 inherits from ABean 404 via inheritance relationship 414, and CBean 408 inherits from ABean 404 via inheritance relationship 418. DBean 410 and EBean 412 inherit from CBean 408. DBean 410 inherits from CBean 408 via inheritance relationship 420, and EBean 412 inherits from CBean 408 via inheritance relationship 422. ABean 404, BBean 406, CBean 408, DBean 410, and EBean 412 map to relational tables A 454, B 456, C 458, D 460, and E 462, respectively.

The second RLI tree 402 also comprises five EJBs: AABean 424, BBBean 426, CCBean 428, DDBean 430, and EEBean 432. BBBean 426 and CCBean 428 inherit from AABean 424. BBBean 426 inherits from AABean 424 via inheritance relationship 438, and CCBean 428 inherits from AABean 424 via inheritance relationship 440. DDBean 430 and EEBean 432 inherit from CCBean 428. DDBean 430 inherits from CCBean 428 via inheritance relationship 442, and EEBean 432 inherits from CCBean 428 via inheritance relationship 444. AABean 424, BBBean 426, CCBean 428, DDBean 430, and EEBean 432 map to relational tables AA 464, BB 466, CC 468, DD 470, and EE 472, respectively.

Assume, there are multiple relationships defined between the first tree 400 and the second tree 402: a first relationship a.rcc 446 relating ABean 404 and CCBean 428, a second relationship rcc.re 448 relating CCBean 428 and EBean 412, and a third relationship re.raa 450 relating EBean 412 and AABean 424.

The following EJB query 452 displays all AABean 424 information which is related to ABean 404.

Select a.rcc.re.raa from Abean a

A conventional system may translate this EJB query 452 to the following SQL query 474 which contains a series of inner joins and outer joins.

Select qaa.*, qbb.*,qcc.*,qdd.*, qee.* from A oj B oj C oj D oj E oj AA oj CC oj DD oj EE oj A oj C oj E oj AA oj BB oj CC oj DD oj EE This conventional translation also results in an invalid query 474 as the query 474 uses an invalid join "oj" 453 between the table AA 464 and the table E 462, an invalid join "oj" 476 between the table A 480 and the table EE 478, and an invalid join "oj" 455 between the table AA 457 and the table E 459. The join 453 and the join 455 are invalid as there is no join between the tables AA (464 and 457) and the tables E (462 and 459) because AABean 424, at the top of the second tree 402, does not inherit in an inheritance relationship from EBean 412, at the bottom of the second tree 402. Nor does the AABean 424 inherit in an inheritance relationship from any of the nodes of first tree 400: ABean 404, BBean 406, CBean 408, DBean 410, or EBean 412. The join 476 is invalid as there is no join between the table A 480 and the table EE 478 because ABean 404, at the top of the first tree 400, does not inherit in an inheritance relationship from EEBean 432, at the bottom of the second tree 402.

By using this algorithm, the above example will be translated to the following valid SQL query 482.

Select qaa.*, qbb.*,qcc.*,qdd.*, qee.* from A oj B oj C oj D oj E oj CC oj AA oj DD oj EE oj E oj C oj A oj AA oj BB oj CC oj DD oj EE This translation results in a valid query 484 as the query 484 uses a valid join "oj" 494 between the table CC 490 and the joins of the preceding table E 496, a valid join "oj" 486 between the table E 488 and the joins of the preceding tables EE 492 through CC 490, and a valid join "oj" 498 between the table AA 499 and the joins of the preceding tables A 497 through E 488. Join 498 between AA 499 and A 497 is valid based upon the relationship re.raa 450 between CCBean 428 and EBean 412, the relationship e.rc 422 between EBean 412 and CBean 408, and the relationship c.ra 418 between CBean 408 and ABean 404. The join 486 is valid based upon the rcc.re relationship 444 between EEBean 432 and CCBean 428 in the second tree 402, and based upon the rcc.re relationship 448 between the CCBean 428 in the second tree 402 and the Ebean 412 at the bottom of the first tree 400. Join 494 between CC 490 and E 496 is valid based upon the relationship rcc.re 448 between CCBean 428 and EBean 412.

For performance, the joins above the target of a relationship are built as inner joins 493, 491, and 489, and the joins below the target of a relationship are built as outer joins resulting in the following optimized query 495.

Select qaa.*, qbb.*,qcc.*,qdd.*, qee.* from A oj B oj C oj D oj E oj CC ij AA oj DD oj EE oj E ij C ij A oj AA oj BB oj CC oj DD oj EE To accomplish the translation of the multiple-relationship EJB query into a valid optimized SQL query, the preferred embodiment of the present invention performs the following steps. During parsing, three inter-hierarchal relationships between the first tree 400 and the second tree 402 are identified, a first relationship a.rcc 446 relating ABean 404 and CCBean 428, a second relationship rcc.re 448 relating CCBean 428 and EBean 412, and a third relationship re.raa 450 relating EBean 412 and AABean 424.

The first relationship a.rcc 446 relating ABean 404 and CCBean 428 is processed by identifying the source class ABean 404 of the inter-hierarchal relationship a.rcc 446, and the source class ABean 404 is mapped into the corresponding source relational tables by mapping ABean 404, BBean 406, CBean 408, DBean 410, and EBean 412 to relational tables A 454, B 456, C 458, D 460, and E 462, respectively. A source series of joins between the source relational tables is built comprising {A oj B oj C oj D oj E}, the source series being ordered in a top-down order from a root ABean 404 of the source object oriented hierarchy 400.

During query rewrite, the target class CCBean 428 of the inter-hierarchal relationship a.rcc 446 is identified, and the target class CCBean 428 is mapped into the corresponding target relational tables by mapping AABean 324, CCBean 328, DDBean 330, FFBean 334, and GGBean 336 to relational tables AA 364, CC 368, DD 370, FF 374, and GG 376, respectively. A target series of joins {CC oj AA oj DD oj EE} between the target relational tables is built, the target series being ordered as two series, a first target series {CC oj AA} starting from the target class and reverse ordered upwards towards a root AABean 424 of the target object oriented hierarchy 402, and a second target series {DD oj EE} starting below the target class and ordered downwards towards leaves of the target object oriented hierarchy 402. The source series of joins {A oj B oj C oj D oj E} and the target series of joins {CC oj AA oj DD oj EE} are combined into the corresponding relational query {A oj B oj C oj D oj E oj CC oj AA oj DD oj EE}.

For the second relationship rcc.re 448 relating CCBean 428 and EBean 412, the source class CCBean 428 is already mapped into the corresponding source relational tables and the source series of joins between the source relational tables is already built as a result of the prior processing of CCBean 428 as the target of the first relationship a.rcc 446. The target class EBean 412 of the inter-hierarchal relationship rcc.re 448 is identified, and the target class EBean 412 is already mapped into the corresponding source relational tables as a result of the prior processing of the first relationship a.rcc 446. A target series of joins {E oj C oj A} between the target relational tables is built, the target series being ordered as two series, a first target series {E oj C oj A} starting from the target class and reverse ordered upwards towards a root ABean 404 of the target object oriented hierarchy 400, and a second empty target series starting below the target class and ordered downwards towards leaves of the target object oriented hierarchy 400. The target series of joins {E oj C oj A} produced by the processing of the second relationship rcc.re 448 is then combined with the series of joins {A oj B oj C oj D oj E oj CC oj AA oj DD oj EE} produced by the processing of the first relationship a.rcc 446 to yield the combined series of joins {A oj B oj C oj D oj E oj CC oj AA oj DD oj EE oj E oj C oj A}.

For the third relationship re.raa 450 relating EBean 412 and AABean 424, the source class EBean 412 is already mapped into the corresponding source relational tables and the source series of joins between the source relational tables is already built as a result of the prior processing of EBean 412 as the target of the second relationship rcc.re 448.

The target class AABean 424 of the inter-hierarchal relationship re.raa 450 is identified, and the target class AABean 424 is mapped into the corresponding target relational tables by mapping AABean 424, BBBean 426, CCBean 428, DDBean 430, and EEBean 432 to relational tables AA 464, BB 466, CC 468, DD 470, and EE 472, respectively. A target series of joins {AA oj BB oj CC oj DD oj EE} between the target relational tables is built, the target series being ordered as two series, an empty first target series starting from the target class AABean 424 and reverse ordered upwards towards the root AABean 424 of the target object oriented hierarchy 402, and a second target series {AA oj BB oj CC oj DD oj EE} starting below the target class AABean 424 and ordered downwards towards leaves of the target object oriented hierarchy 402.

The target series of joins {AA oj BB oj CC oj DD oj EE} produced by the processing of the third relationship re.raa 450 is then combined with the series of joins {A oj B oj C oj D oj E oj CC oj AA oj DD oj EE oj E oj C oj A} produced by the processing of the first relationship a.rcc 446 and second relationship rcc.re 448 to yield the combined series of joins {A oj B oj C oj D oj E oj CC oj AA oj DD oj EE oj E oj C oj A oj AA oj BB oj CC oj DD oj EE}. In query rewrite, this combined series of joins may be further reordered by recursively finding a join relationship between a current node and a preceding node in the combined series of joins. Although the combined series of joins {A oj B oj C oj D oj E oj CC oj AA oj DD oj EE oj E oj C oj A oj AA oj BB oj CC oj DD oj EE} does not require reordering, alternate combined series of joins would be reordered by such query rewrite into the same combined series of joins {A oj B oj C oj D oj E oj CC oj AA oj DD oj EE oj E oj C oj A oj AA oj BB oj CC oj DD oj EE}.

In query optimization, the joins above the target of a relationship are built as inner joins 493, 491, 489 and 487, and the joins below the target of a relationship are built as outer joins resulting in the following optimized query 495.

Figure 5:
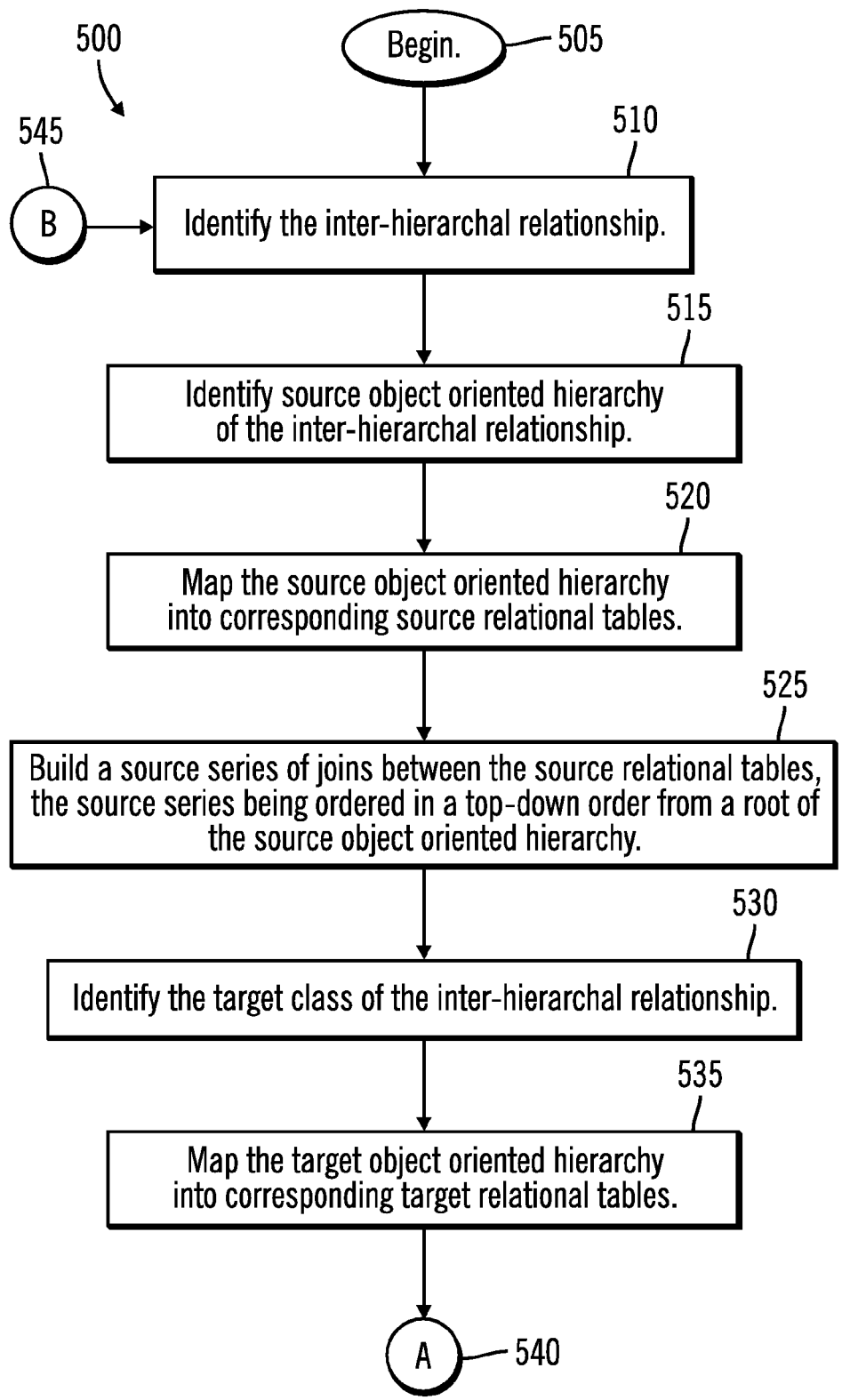
FIG. 5 and FIG. 6 are flowcharts of method steps preferred in carrying out a preferred embodiment of the present invention.
Figure 6:
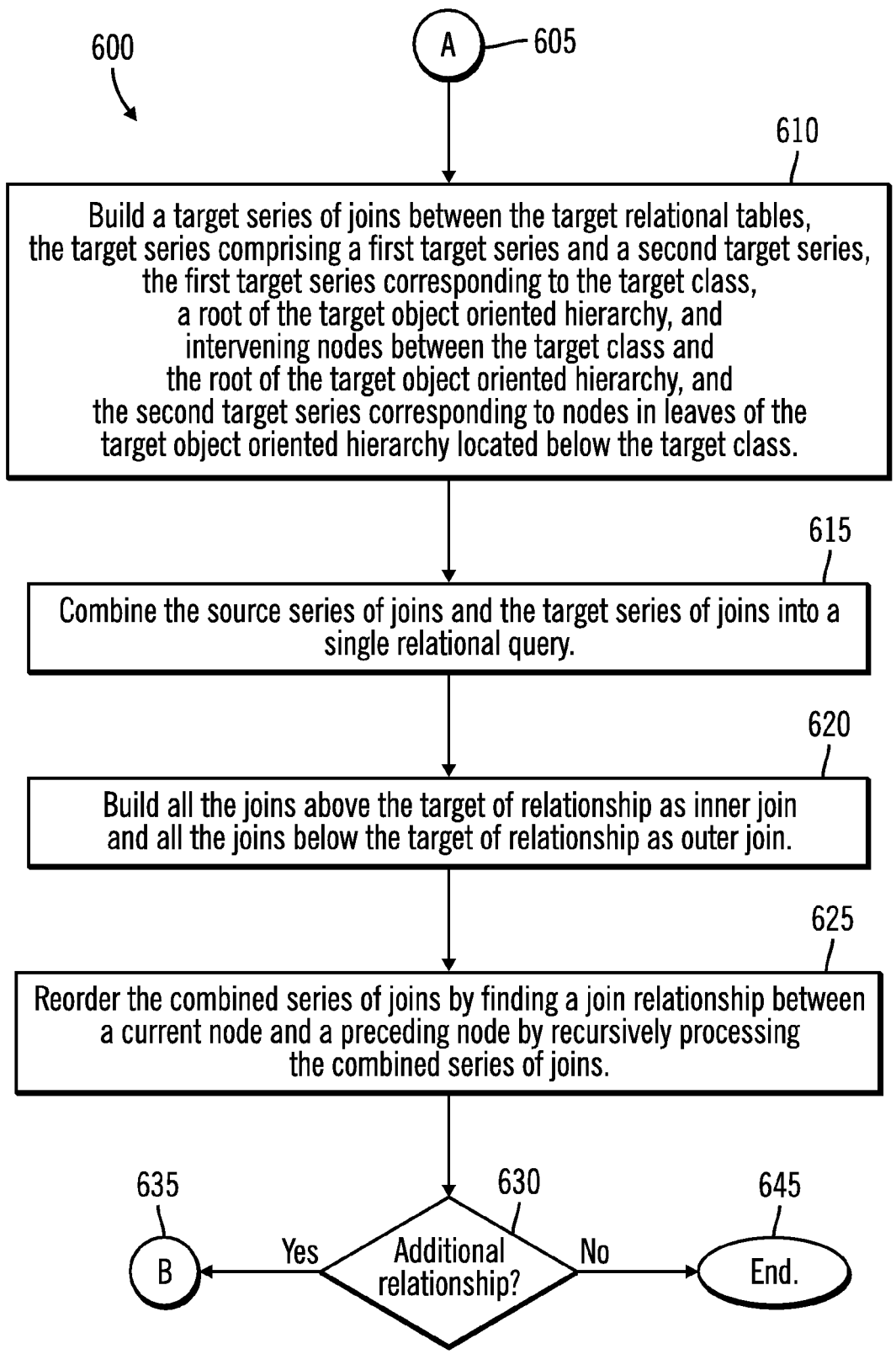

Select qaa.\*, qbb.\*,qcc.\*,qdd.\*, qee.\* from A oj B oj C oj D oj E oj CC ij AA oj DD oj EE oj E ij C ij A oj AA oj BB oj CC oj DD oj EE Referring now to FIGS. 5 and 6, the flowcharts 500 and 600 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

After the start 505 of the process 500, process block 510 identifies the inter-hierarchal relationship, and process block 515 identifies the source object oriented hierarchy of the inter-hierarchal relationship. Thereafter, process block 520 maps the source object oriented hierarchy into corresponding source relational tables. Process block 525 then builds a source series of joins between the source relational tables, the source series being ordered in a top-down order from a root of the source object oriented hierarchy. Process block 530 identifies the target class of the inter-hierarchal relationship, and process block 535 maps the target object oriented hierarchy into corresponding target relational. Control passes to process block 610 on FIG. 6, illustrated by flowchart connectors A, 540 on FIG. 5 and 605 on FIG. 6. Process block 610 builds a target series of joins between the target relational tables, the target series comprising a first target series and a second target series, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class. Process block 615 then combines the source series of joins and the target series of joins into a single relational query. Process block 620 builds all the joins above the target of relationship as inner join and all the joins bellow the target of relationship as outer join. Process block 625 reorders the combined series of joins by finding a join relationship between a current node and a preceding node by recursively processing the combined series of joins. Thereafter, decision block 630 checks for an additional relationship. If there is an additional relationship, then control loops back to process block 510 to repeat the process for the additional relationship. This control path is illustrated by flowchart connectors B, 635 on FIG. 6 and 545 on FIG. 5.

Returning now to decision block 630, if there is no additional relationship to process, then the process ends at process block 645.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims. User input may be received from the keyboard, mouse, pen, voice, touch screen, or any other means by which a human can input data to a computer, including through other programs such as application programs, databases, data sets, or files.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

I claim:

1. A method of translating an object oriented query into a corresponding relational query, said object oriented query comprising a query against a plurality of object oriented hierarchies, said object oriented hierarchies comprising a plurality of object classes related by a root leaf inheritance relationship, at least two of the object oriented hierarchies, a source object oriented hierarchy and a target object oriented hierarchy, being related by an inter-hierarchal relationship between the two object oriented hierarchies, said inter-hierarchal relationship relating a source class of the source object oriented hierarchy and a target class of the target object oriented hierarchy, said method comprising:

identifying the inter-hierarchal relationship;
identifying the source object oriented hierarchy of the inter-hierarchal relationship;
mapping the source object oriented hierarchy into corresponding source relational tables;
building a source series of joins between the source relational tables, the source series being ordered in a top-down order from a root of the source object oriented hierarchy;
identifying the target class of the inter-hierarchal relationship;
mapping the target object oriented hierarchy into corresponding target relational tables;
building a target series of joins between the target relational tables, the target series comprising a first target series and a second target series, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and
combining the source series of joins and the target series of joins into the corresponding relational query.

2. The method of claim 1, wherein the object oriented query is based upon a plurality of relationships between the object oriented hierarchies, and wherein the steps are repeated for each of the plurality of relationships.

3. The method of claim 2, further comprising reordering the combined series of joins by recursively finding a join relationship between a current node and a preceding node in the combined series of joins.

4. A method of translating an object oriented query into a corresponding relational query, said object oriented query comprising a query against a plurality of object oriented hierarchies, said object oriented hierarchies comprising a plurality of object classes related by a root leaf inheritance relationship, at least two of the object oriented hierarchies, a source object oriented hierarchy and a target object oriented hierarchy, being related by an inter-hierarchal relationship between the two object oriented hierarchies, said inter-hierarchal relationship relating a source class of the source object oriented hierarchy and a target class of the target object oriented hierarchy, said method comprising:

identifying the inter-hierarchal relationship;
identifying the source object oriented hierarchy of the inter-hierarchal relationship;
mapping the source object oriented hierarchy into corresponding source relational tables;
building a source series of joins between the source relational tables, the source series being ordered in a top-down order from a root of the source object oriented hierarchy;

identifying the target class of the inter-hierarchal relationship;

mapping the target object oriented hierarchy into corresponding target relational tables;

building a target series of joins between the target relational tables, the target series comprising a first target series of inner joins and a second target series of outer joins, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and combining the source series of joins and the target series of joins into the corresponding relational query.

5. An article of manufacture for use in a computer system for translating an object oriented query into a corresponding relational query, said object oriented query comprising a query against a plurality of object oriented hierarchies, said object oriented hierarchies comprising a plurality of object classes related by a root leaf inheritance relationship, at least two of the object oriented hierarchies, a source object oriented hierarchy and a target object oriented hierarchy, being related by an inter-hierarchal relationship between the two object oriented hierarchies, said inter-hierarchal relationship relating a source class of the source object oriented hierarchy and a target class of the target object oriented hierarchy, said article of manufacture comprising a computer-useable storage medium having a computer program embodied in said medium which causes the computer system to perform:

identifying the inter-hierarchal relationship;

identifying the source object oriented hierarchy of the inter-hierarchal relationship;

mapping the source object oriented hierarchy into corresponding source relational tables;

building a source series of joins between the source relational tables, the source series being ordered in a top-down order from a root of the source object oriented hierarchy;

identifying the target class of the inter-hierarchal relationship;

mapping the target object oriented hierarchy into corresponding target relational tables;

building a target series of joins between the target relational tables, the target series comprising a first target series and a second target series, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and combining the source series of joins and the target series of joins into the corresponding relational query.

6. The article of manufacture of claim 5, wherein the object oriented query is based upon a plurality of relationships between the object oriented hierarchies, and the embodied computer program embodied in said medium can further cause the computer system to repeat the steps for each of the plurality of relationships.

7. The article of manufacture of claim 6, wherein the embodied computer program embodied in said medium can further cause the computer system to reorder the combined series of joins by recursively finding a join relationship between a current node and a preceding node in the combined series of joins.

8. An article of manufacture for use in a computer system for translating an object oriented query into a corresponding relational query, said object oriented query comprising a query against a plurality of object oriented hierarchies, said object oriented hierarchies comprising a plurality of object classes related by a root leaf inheritance relationship, at least two of the object oriented hierarchies, a source object oriented hierarchy and a target object oriented hierarchy, being related by an inter-hierarchal relationship between the two object oriented hierarchies, said inter-hierarchal relationship relating a source class of the source object oriented hierarchy and a target class of the target object oriented hierarchy, said article of manufacture comprising a computer-useable storage medium having a computer program embodied in said medium which causes the computer system to perform:

identifying the inter-hierarchal relationship;

identifying the source object oriented hierarchy of the inter-hierarchal relationship;

mapping the source object oriented hierarchy into corresponding source relational tables;

building a source series of joins between the source relational tables, the source series being ordered in a top-down order from a root of the source object oriented hierarchy;

identifying the target class of the inter-hierarchal relationship;

mapping the target object oriented hierarchy into corresponding target relational tables;

building a target series of joins between the target relational tables, the target series comprising a first target series of inner joins and a second target series of outer joins, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and combining the source series of joins and the target series of joins into the corresponding relational query.

9. A computer system for debugging an executing computer program on the computer system for translating an object oriented query into a corresponding relational query, said object oriented query comprising a query against a plurality of object oriented hierarchies, said object oriented hierarchies comprising a plurality of object classes related by a root leaf inheritance relationship, at least two of the object oriented hierarchies, a source object oriented hierarchy and a target object oriented hierarchy, being related by an inter-hierarchal relationship between the two object oriented hierarchies, said inter-hierarchal relationship relating a source class of the source object oriented hierarchy and a target class of the target object oriented hierarchy, said computer system comprising:

computer program instructions for identifying the inter-hierarchal relationship;

computer program instructions for identifying the source object oriented hierarchy of the inter-hierarchal relationship;

computer program instructions for mapping the source object oriented hierarchy into corresponding source relational tables;

computer program instructions for building a source series of joins between the source relational tables, the source series being ordered in a top-down order from a root of the source object oriented hierarchy;

computer program instructions for identifying the target class of the inter-hierarchal relationship;

computer program instructions for mapping the target object oriented hierarchy into corresponding target relational tables;

computer program instructions for building a target series of joins between the target relational tables, the target series comprising a first target series and a second target series, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and computer program instructions for combining the source series of joins and the target series of joins into the corresponding relational query.

10. The computer system of claim 9, wherein the object oriented query is based upon a plurality of relationships between the object oriented hierarchies, further comprising computer instructions for repeating the computer instructions of claim 9 for each of the plurality of relationships.

11. The computer system of claim 10 further comprising computer instructions for reordering the combined series of joins by recursively finding a join relationship between a current node and a preceding node in the combined series of joins.

12. A computer system for debugging and executing a computer program on the computer system for translating an object oriented query into a corresponding relational query, said object oriented query comprising a query against a plurality of object oriented hierarchies, said object oriented hierarchies comprising a plurality of object classes related by a root leaf inheritance relationship, at least two of the object oriented hierarchies, a source object oriented hierarchy and a target object oriented hierarchy, being related by an inter-hierarchal relationship between the two object oriented hierarchies, said inter-hierarchal relationship relating a source class of the source object oriented hierarchy and a target class of the target object oriented hierarchy, said computer system comprising:

computer program instructions for identifying the inter-hierarchal relationship;

computer program instructions for identifying the source object oriented hierarchy of the inter-hierarchal relationship;

computer program instructions for mapping the source object oriented hierarchy into corresponding source relational tables;

computer program instructions for building a source series of joins between the source relational tables, the source series being ordered in a top-down order from a root of the source object oriented hierarchy;

computer program instructions for identifying the target class of the inter-hierarchal relationship;

computer program instructions for mapping the target object oriented hierarchy into corresponding target relational tables;

computer program instructions for building a target series of joins between the target relational tables, the target series comprising a first target series of inner joins and a second target series of outer joins, the first target series corresponding to the target class, a root of the target object oriented hierarchy, and intervening nodes between the target class and the root of the target object oriented hierarchy, and the second target series corresponding to nodes in leaves of the target object oriented hierarchy located below the target class; and computer program instructions for combining the source series of joins and the target series of joins into the corresponding relational query.

* * * * *